United States Patent [19]

Kaneko

[11] Patent Number: 5,467,157
[45] Date of Patent: Nov. 14, 1995

[54] SMALL-SIZED TRIPOD HEAD WITH CONNECTING CABLE ATTACHED TO DRIVING SHAFT

[75] Inventor: Kouji Kaneko, Omiya, Japan

[73] Assignee: Fuji Photo Optical Co., Ltd., Omiya, Japan

[21] Appl. No.: 268,130

[22] Filed: Jul. 6, 1994

[30] Foreign Application Priority Data

Jul. 8, 1993 [JP] Japan .................................. 5-193054

[51] Int. Cl.⁶ .................................................. G03B 29/00
[52] U.S. Cl. .......................................... 354/81; 248/186.1
[58] Field of Search .......................... 310/68 B; 354/81, 354/293; 248/176, 177, 178, 187

[56] References Cited

U.S. PATENT DOCUMENTS 5,394,209  2/1995  Stiepel et al. ......................... 354/81

Primary Examiner—David M. Gray
Attorney, Agent, or Firm—Oliff & Berridge

[57] ABSTRACT

A small-sized tripod head for tilting or panning a television camera or the like by remote control. The connecting cable of the tripod head does not obstruct a smooth motion of the tripod head. Annular terminals are disposed on the outer periphery of a driving shaft extending over 360 degrees, and brush contacts which come into contact with the annular terminals are provided on the main body. The annular terminals and the contacts constitute a power supply line, which allows the driving shaft to rotate more than 360 degrees. A light guide is disposed at the center of the driving shaft, and a photoelectric transducer is provided on the main body in such a manner as to be isolated from the light guide. A control signal, a video signal, etc. are transmitted by the light guide and the photoelectric transducer. This light signal transmission line can transmit various light signals by using a plurality of beams having different wavelengths obtained by a beam splitter.

7 Claims, 4 Drawing Sheets

5,467,157

SMALL-SIZED TRIPOD HEAD WITH CONNECTING CABLE ATTACHED TO DRIVING SHAFT

BACKGROUND OF THE INVENTION

This application claims the priority of Japanese Patent Application No. 5-193054 filed on Jul. 8, 1993 which is incorporated herein by reference.

1. Field of the Invention

The present invention relates to the structure for supplying a signal and a power to a small-sized tripod head which directs a camera or the like to a desired direction by remote control.

2. Description of the Related Art

In photographing by a television camera in broadcasting of ITV (Industrial Television), CCTV (Closed-Circuit Television) or the like, the television camera is often remote-controlled in order to take a good picture of a subject or to take a picture in a predetermined range. As a means for turning the television camera, a tripod head is used.

A conventional tripod head is comparatively heavy, but since the television camera has recently become smaller and lighter and it has had a simpler structure, the present applicant has proposed a smaller tripod head in view of the recent trend of the television camera.

FIG. 7 shows the structure of a conventional tripod head. Two driving shafts which are orthognal to each other are provided in a tripod head (main body) 1, and supporting disks 2 and 3 are connected to the driving shafts. A cable 5 which is connected to a controller or the like through a connector 4 is attached to the tripod head 1, and through the cable 5, not only is a power supplied but also a control signal, etc. are transmitted. One of the supporting disks, for example, the supporting disk 3 is attached to a supporting piece 6 disposed on a wall or the like, and a television camera is attached to the other supporting disk 2 in such a manner as to be in parallel with the front surface of the tripod head 1. According to this structure, when the supporting disk 3 is rotated by controlling the driving shaft, the television camera is tilted (vertical direction), while the television camera is panned (horizontal direction) by the rotation of the supporting disk 2. In this way, it is possible to move the television camera in a desired range by remote control.

In such a small-sized tripod head, when the tripod head 1 is rotated (tilted), the cable 5, which is connected to the controller, is also rotated, so that the smooth motion of the tripod head 1 is restricted to the limit of the flexibility of the cable 5. In addition, it is difficult to rotate the tripod head 1 not less than 360 degrees. The weight of the cable 5 constitutes an extra load to the motor for driving the driving shafts, which makes it difficult to reduce the size of the motor and, hence, the tripod head 1 as a whole.

SUMMARY OF THE INVENTION

Accordingly, it is an object of the present invention to eliminate the above-described problems in the related art and to provide a small-sized tripod head with a cable which does not obstruct a smooth motion of the tripod head, which is capable of reducing the load of the motor and which allows the tripod head to rotate not less than 360 degrees.

To achieve this aim, the present invention provides a small-sized tripod head with a connecting cable attached to a driving shaft, comprising: at least two driving shafts which are disposed, for example, so as to be orthogonal to each other; a power supply mechanism disposed coaxially with one of the driving shafts so as to maintain the connection between the driving shaft and the power line of the main body of the tripod head during the rotation of the driving shaft; a light guide disposed coaxially with the driving shaft so as to transmit a light signal; and a photoelectric transducer disposed on the main body in such a manner as to be isolated from the light guide so as to convert a light signal into an electric signal; whereby a power is supplied by the power supply mechanism and a signal is transmitted by the light guide and the photoelectric transducer.

The power supply mechanism is composed of positive and negative annular terminals provided on the outer periphery of the driving shaft or on the main body extending over 360 degrees, and contacts disposed on the main body or on the outer periphery of the driving shaft at the positions which are in contact with the annular terminals, so that it is possible to rotate the driving shaft not less than 360 degrees.

If a plurality of photoelectric transducers are provided and a beam splitter is provided between the light guide and the plurality of photoelectric transducers, it is possible to transmit various signals by using a plurality of beams having different wavelengths obtained through the beam splitter.

It is also possible to dispose the power supply mechanism, the light guide and the photoelectric transducers on each of the two driving shafts, thereby enabling power supply and signal transmission not only between the remote control portion and the main body but also between the main body and an object of driving.

According to this structure, the power supply line is maintained by the power supply mechanism even during the rotation of the driving shafts, and a transmission line for a control signal and a video signal is maintained by the light guide and the photoelectric transducers even during the rotation of the driving shafts. In the power supply means, the positive and negative terminals are disposed annularly extending over 360 degrees on the driving shaft, so that it is possible to drive the driving shaft more than 360 degrees. In the signal transmission line, by selecting a plurality of beams having different wavelengths through the beam splitter, it is possible to transmit a plurality of control signals, video signals, etc. simultaneously.

The above and other objects, features and advantages of the present invention will become clear from the following description of the preferred embodiments thereof, taken in conjunction with the accompanying drawings.

DESCRIPTION OF THE PREFERRED EMBODIMENT

Figure 1:
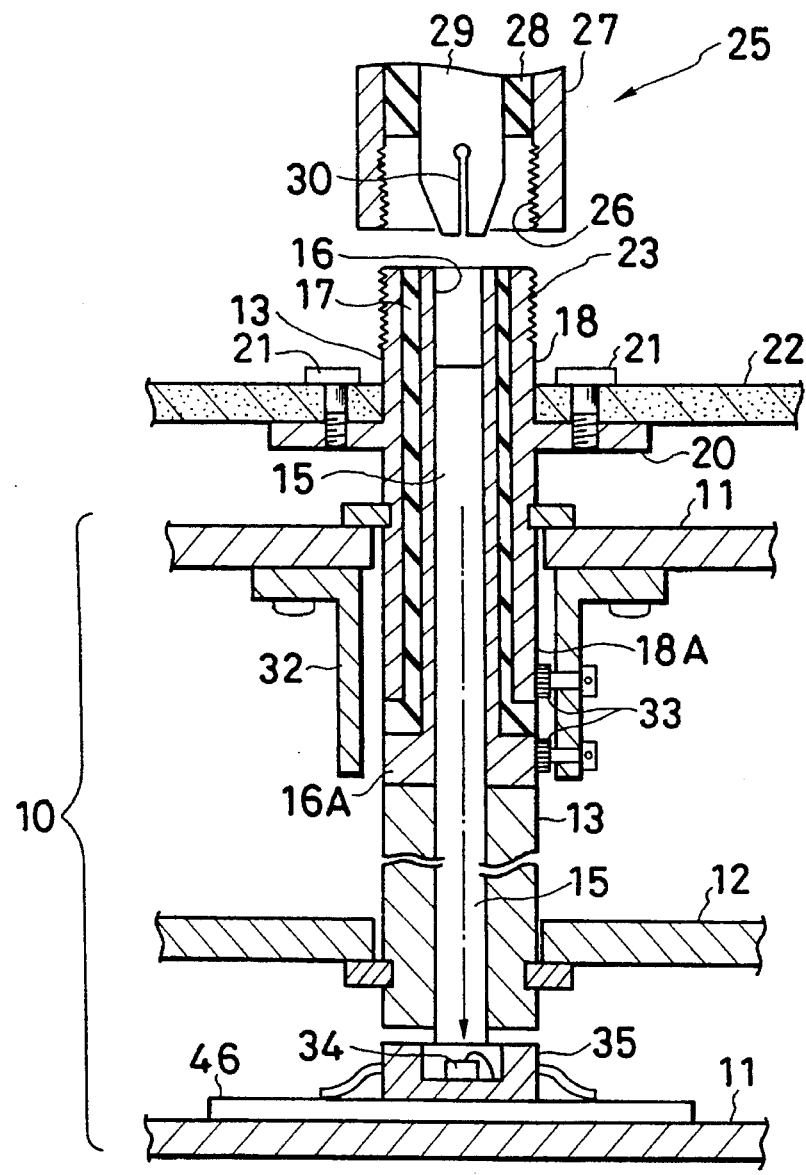
FIG. 1 is a sectional view of a first embodiment of a small-sized tripod head according to the present invention, showing the structure thereof in the vicinity of a driving shaft.

FIG. 1 shows the structure of one driving shaft portion in a first embodiment of a small-sized tripod head according to the present invention. A driving shaft 13 is supported by the outer case (main body) 11 of a tripod head 10 and a partition plate 12, as shown in FIG. 1. The driving shaft 13 is connected to a motor by a gear train, as will be described later. A light guide 15 composed of an optical fiber is disposed at the center of the driving shaft 13, and a positive cylinder 16 composed of an electric conductive material, an insulated cylinder 17 and a negative cylinder 18 composed of an electric conductive material are provided around the light guide 15 coaxially therewith. The positive cylinder 16 and the negative cylinder 18 are provided as a power supply line. The lower portion of the positive cylinder 16 constitutes a flange terminal (annular terminal) 16A which is exposed extending over 360 degrees on the outer periphery of the driving shaft 13. In the negative cylinder 18, at least an annular terminal 18A at the lower portion is also exposed extending over 360 degrees (the other portion may be covered with an insulating film).

Figure 2:
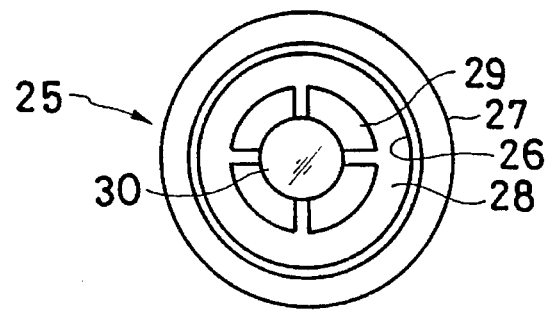
FIG. 2 is an elevational view of a connector on the cable side, showing the structure of the connecting surface thereof.

A supporting disk (stage) 20 is attached to the negative cylinder 18, and the supporting disk 20 is fixed to a mounting portion 22 such as a wall and a ceiling by screws 21. A male screw portion 23 is provided at the upper portion of the negative cylinder 18 so that the upper portion of the driving shaft 13 constitutes the male side of a connector. A female connector 25 for the cable which is connected to a controller or the like is connected with the upper portion of the driving shaft 13. FIG. 2 shows the front elevation of the connecting surface of the connector 25. As shown in FIG. 2, the connector 25 is composed of a negative cylinder 27 with a female screw portion 26 formed thereon, an insulated cylinder 28, a positive cylinder 29, and a light guide 30 disposed in the positive cylinder 29. The positive cylinder 29 is connected with the positive cylinder 16 in the driving shaft 13 and the negative cylinder 27 is connected with the negative cylinder 18 in the driving shaft 13, thereby constituting a power supply line to the tripod head 10.

In the tripod head 10, a brush cylinder 32 is attached to the inside of the outer case 11 by screws or the like, and two brushes (contacts composed of an electric conductive material) 33 are attached to the inside of the brush cylinder 32 so as to come into contact with the annular terminals 16A, 18A. Therefore, when the driving shaft 13 rotates, the contact between the brush 33 and the annular terminals 16A, 18A are maintained on the entire periphery of the driving shaft 13 extending over 360 degrees, and a power is supplied from the brush 33 to a motor or the like through a power supply line (not shown).

On the inside of the outer case 11 and at the lower portion of the driving shaft 13 is disposed a light receiving portion 34 having a light receiving element 34 such as a photodiode. The light receiving portion 35 is attached to the inside of the outer case 11 in proximity to the light guide 15 and in the state of being isolated therefrom. Therefore, even during the rotation of the driving shaft 13, the light receiving portion 35 can receive a light signal from the light guide 15. Although the light guide 15 is composed of an optical fiber, it may simply have a hollow structure or replaced by another material having a light transmission property.

Figure 3:
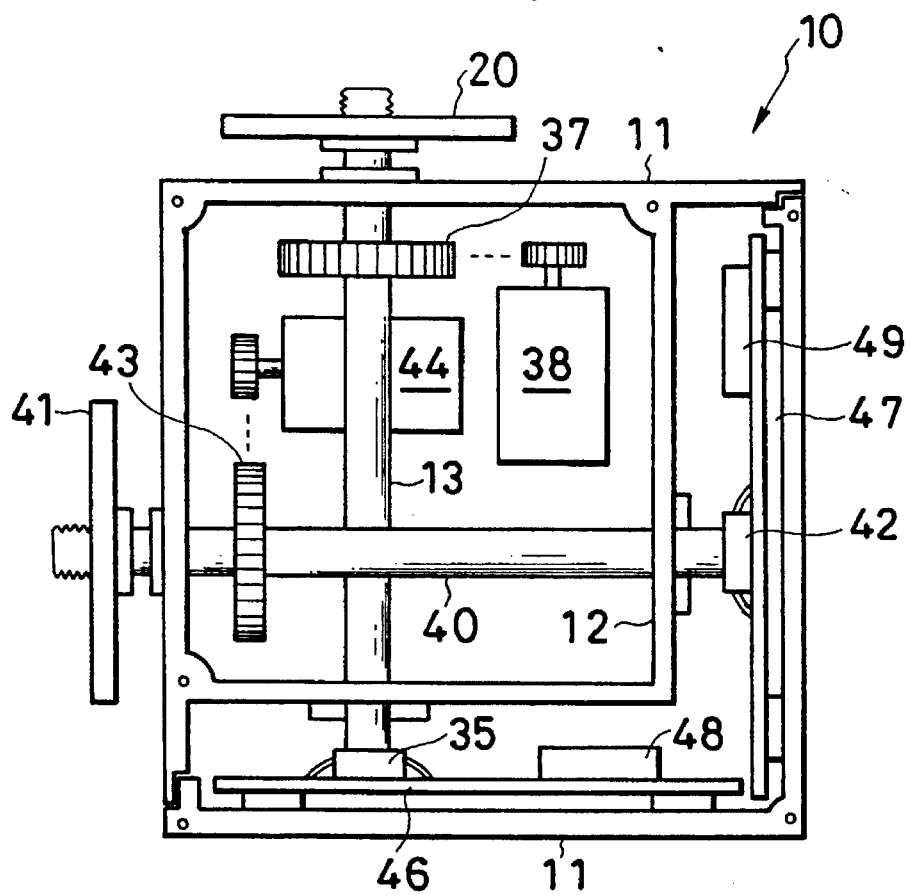
FIG. 3 schematically shows the entire structure of the first embodiment of a small-sized tripod head according to the present invention.

FIG. 3 shows the entire structure of the first embodiment of a tripod head. As shown in FIG. 3, the driving shaft 13 and the elements related thereto are first provided, and a motor 38 is connected to the driving shaft 13 through a gear train 37 including a driving shaft gear. Another driving shaft 40 having the same structure as that of the driving shaft 13 is provided in such a manner as to be orthogonal to each other, and a supporting disk 41, a light emitting portion (or a light emitting/receiving portion which will be described later) 42, a gear train 43 including a driving shaft gear, and a motor 44 are attached to the driving shaft 40. The light receiving portion 35 and the light emitting portion 42 are attached to circuit boards 46, 47, respectively, and control circuits 48, 49 for executing various controls are mounted on the circuit boards 46, 47, respectively.

In the tripod head 10 having the above-described structure, the supporting disk 20, for example, is fixed to the mounting portion 22 such as a wall, and a television camera is connected to the other supporting disk 41. At this time, by connecting the connector 25 with the male screw portion 32 of the driving shaft 13, as shown in FIG. 1, electrical and optical connection between the tripod head 10 and the television camera is established.

To state this more concretely, when the connector 25 is screwed into the male screw portion 23 of the driving shaft 13 in FIG. 1, the positive cylinder 27 and the negative cylinder 29 of the connector 25 come into contact with the positive cylinder 16 and the negative cylinder 18 of the driving shaft 13, thereby maintaining the electrical connection of the power supply line. Simultaneously, the light guide 30 of the connector 25 and the light guide 15 of the driving shaft 13 are optically connected with each other. Consequently, a light signal transmitted through the light guides 30, 15 is received by the light receiving portion 35. As the light signal, there are a control signal for the tripod head 10 itself, a control signal for the television camera, etc., and these control signals are transmitted to the tripod head 10 as a light signal. In the other driving shaft 49, a control signal is transmitted from the light emitting portion 42 to the television camera.

While the driving shaft 13 (40) in the tripod head 10 is rotated so as to tilt or pan the television camera, since the terminals 16A, 18A, which are disposed on the periphery of the driving shaft extending over 360 degrees, come into contact with the brushes 33, the power supply line is secured, and since the light guides 15, 30 are disposed at the center of the driving shaft 13, the light signal transmission line is secured. In addition, the tripod head 10 is advantageous in that both the power supply line and the light signal transmission line can maintain the connection even if the driving shaft 13 rotates more than 360 degrees.

Figure 4:
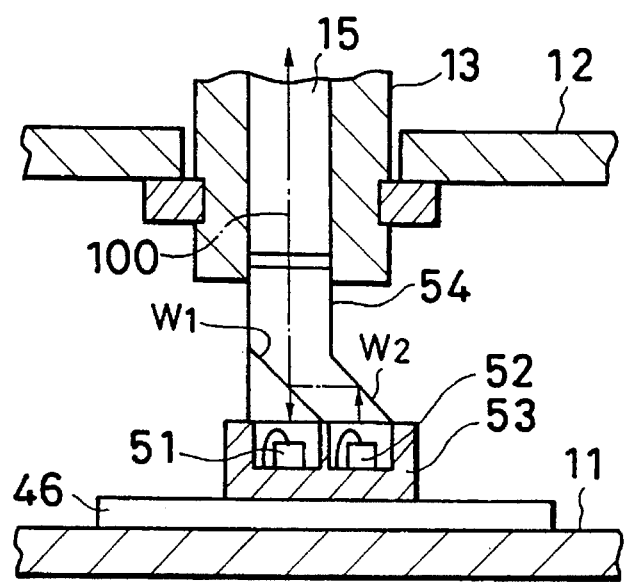
FIG. 4 is a sectional view of the beam splitter in the first embodiment shown in FIG. 1.

In such light signal transmission, it is preferable that not only reception (one-line transmission) but also transmission can be executed. FIG. 4 shows the structure of a light signal transmission line which can transmit and receive a light signal by using beams having different wavelengths which are obtained through a beam splitter. The circuit board 46 is provided with a light emitting/receiving portion 53 having a light receiving element 51 and a light emitting element 52 such as a light emitting diode, and a beam splitter 54 having a half prism structure is fixed to the light emitting/receiving portion 53 in the state of being isolated from the light guide 15. In the light 100 transmitted through the light guide 15, only the light in a predetermined wavelength range A is caused to enter the light receiving element 51 by a first surface (translucent surface) W1 of the beam splitter 54, while the light in the other wavelength range B is reflected to the second surface W2 of the beams splitter 54. On the other hand, light in a wavelength range B, which is different from the predetermined wavelength range A, is emitted from the light emitting element 52, and this light is reflected by both the second surface W2 and the first surface W1 and transmitted through the light guide 15. Therefore, by changing the wavelength ranges used for light emission and light reception, both transmission and reception of a light signal is possible. For example, the transmission of a video signal obtained by the television camera is possible.

Figure 5:
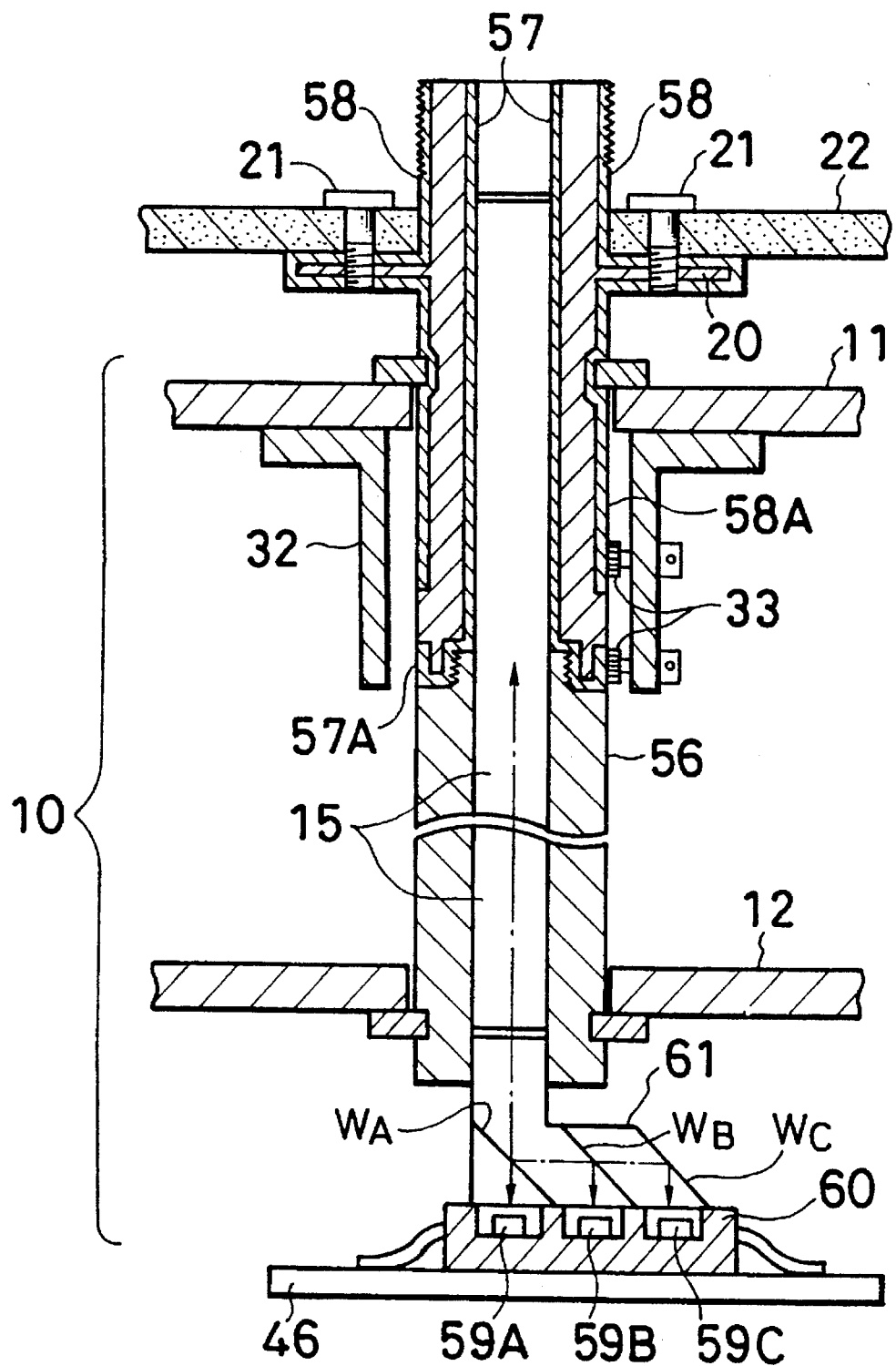
FIG. 5 is a sectional view of a second embodiment of a small-sized tripod head according to the present invention, showing the structure thereof in the vicinity of a driving shaft.

FIG. 5 shows the structure of a second embodiment of a small-sized tripod head according to the present invention. In the second embodiment, the power supply line is composed of a plated metal, and the wavelengths used for light transmission are divided into three ranges. In FIG. 5, a light guide 15 is disposed at the center of a driving shaft 56, a positive metal-plated film 57 is formed on the outer periphery of the light guide 15, and a negative metal-plated film 58 is formed on the outer periphery of the driving shaft 56. The lower portion of the positive metal-plated film 57 is extended toward the outer periphery of the driving shaft 56, and at the lower portion is formed an annular terminal 57A which is exposed around the outer periphery of the driving shaft 56 extending over 360 degrees. In the negative metal-plated film 58, at least an annular terminal 58A at the lower portion thereof is also exposed extending over 360 degrees. According to this embodiment, even if the driving shaft 56 rotates more than 360 degrees, the connection of the power supply line is maintained in the same way as in the first embodiment.

A circuit board 46 is provided with a light emitting/receiving portion 60 having at least three elements 59A to 59C each composed of either a light receiving element or a light emitting element, and a beam splitter 61 is provided between the light emitting/receiving portion 60 and the light guide 15 in the driving shaft 56 in such a manner as to be isolated from the light guide 15.

Figure 6:
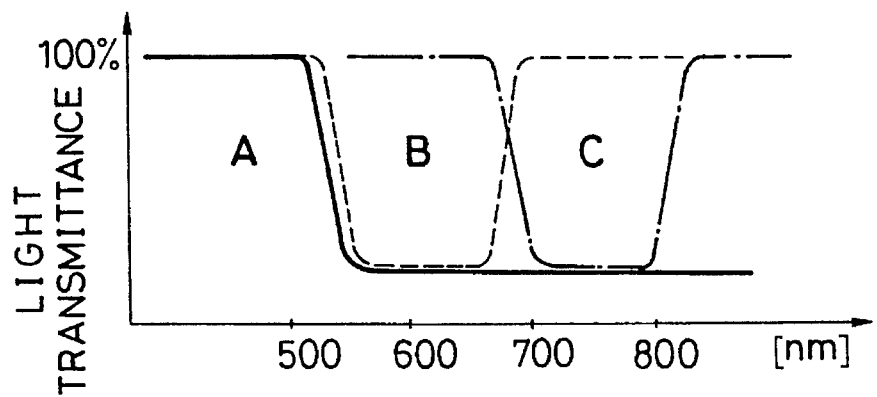
FIG. 6 is the light transmittance characteristic curve showing the wavelength range selected in the second embodiment.
Figure 7:
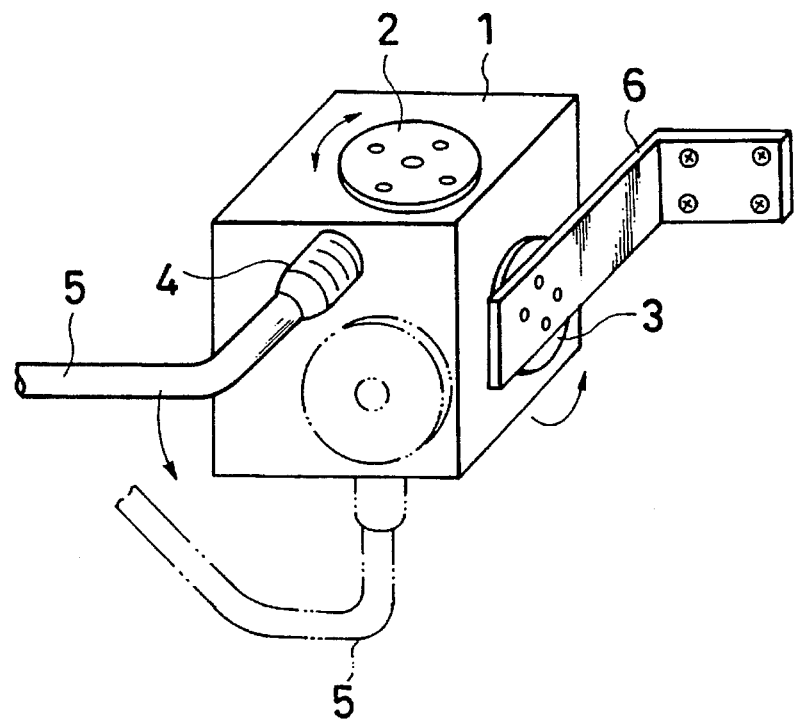
FIG. 7 is a perspective view of a conventional tripod head, showing the external structure thereof.

The beam splitter 61 has a first surface (translucent surface) WA to a third surface WC, the first surface WA transmitting the light in a wavelength range A in FIG. 6, the second surface WB reflecting the light in a wavelength range B and the third surface WC reflecting the light in a wavelength range C. Therefore, in the second embodiment, the elements 59A to 59C each composed of either a light receiving element or a light emitting element can emit or receive the light in one of the predetermined wavelength ranges A to C, thereby enabling the transmission and reception of a plurality of various control signals and video signals.

The power supply mechanism as the power supply line which is composed of the positive cylinder 16 and the negative cylinder 18 (positive metal-plated film 57 and the negative metal-plated film 58) is cylindrical in the above-described embodiments, but it is also possible to provide at least the terminal portions such as the annular terminals 16A, 18A, (57A, 58A) coaxially with the driving shaft 13 (56) and to use a power supply line which is rotatable about 360 degrees for the other elements. The annular terminals 16A, 18A (57A, 58A) and the other power supply line may be provided in the angular range of not more than 360 degrees. It is also possible to fix the annular terminals 16A, 18A (57A, 58A) to the outer case 11 and dispose contacts such as brushes on the driving shafts.

Furthermore, although the translucent beam splitter 54 (61) is used in these embodiments, the splitting means is not restricted thereto and a filter having a wavelength selectivity may be disposed on the light emitting/receiving element 35 (60) as a beam splitter.

As described above, according to the present invention, since the power supply line composed of the power supply mechanism and the light signal supply line composed of the light guide and the photoelectric transducers are provided coaxially with the driving shaft, it is possible to drive the tripod head smooth and to reduce the load of the motor. In addition, it is possible to secure the power supply line even if the driving shaft rotates not less than 360 degrees. Furthermore, transmission and reception of a plurality of control signals and video signals is facilitated by using a plurality of beams having different wavelengths which are obtained by the beam splitter.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A small-sized tripod head with a connecting cable attached to a driving shaft, comprising:

at least two driving shafts;

a power supply mechanism disposed coaxially with one of said driving shafts so as to maintain the connection between said driving shaft and the power line of the main body of said tripod head during the rotation of said driving shaft;

a light guide disposed coaxially with said driving shaft so as to transmit a light signal; and a photoelectric transducer disposed on said main body of said tripod head in such a manner as to be isolated from said light guide so as to convert a light signal into an electric signal;

whereby a power is supplied by said power supply mechanism and a signal is transmitted by said light guide and said photoelectric transducer.

2. A small-sized tripod head with a connecting cable attached to a driving shaft according to claim 1, wherein said power supply mechanism includes positive and negative annular terminals provided on the outer periphery of said driving shaft or on said main body extending over 360 degrees, and contacts disposed on said main body or on the outer periphery of said driving shaft at the positions which are in contact with said annular terminals, thereby allowing said driving shaft to rotate not less than 360 degrees.

3. A small-sized tripod head with a connecting cable attached to a driving shaft according to claim 1, wherein a plurality of said photoelectric transducers are provided, and a beam splitter is provided between said light guide and said plurality of photoelectric transducers so as to transmit various signals by using a plurality of beams having different wavelengths obtained through said beam splitter.

4. A small-sized tripod head with a connecting cable attached to a driving shaft according to claim 1, wherein said power supply mechanism is provided in each of said driving shafts so as to supply a power to said main body through one of said driving shafts and to supply a power to an object of driving through the other of said driving shafts.

5. A small-sized tripod head with a connecting cable attached to a driving shaft according to claim 1, wherein said light guide and said photoelectric transducers are provided in each of said driving shafts so as to transmit a signal between a remote control portion and said main body through one of said driving shafts and to transmit a signal between said main body and an object of driving through the other of said driving shafts.

6. A small-sized tripod head with a connecting cable attached to a driving shaft, comprising:

two driving shafts which are orthogonal to each other with one being fixed to a fixed member and the other being fixed to an object of driving;

a power supply mechanism for supplying a power from an external equipment to the main body of said tripod head, said power supply including positive and negative annular terminals disposed on the outer periphery of one of said driving shafts and brush contacts disposed on said main body;

a light guide disposed at the center of said driving shaft so as to transmit a light signal; and a photoelectric transducer disposed on said main body in such a manner as to be isolated from said light guide so as to convert a light signal into an electric signal;

whereby a signal is transmitted between an external equipment and said main body by said light guide and said photoelectric transducer.

7. A small-sized tripod head with a connecting cable attached to a driving shaft according to claim 6, wherein a plurality of said photoelectric transducers are provided, and a beam splitter is provided between said light guide and said plurality of photoelectric transducers so as to transmit various signals by using a plurality of beams having different wavelengths obtained through said beam splitter.

* * * * *